United States Patent [19]
Ogden, Sr. et al.

[11] 3,731,048
[45] May 1, 1973

[54] AIR COOLED WELDING GUN

[75] Inventors: Ralph Ogden, Sr., Munster; John G. Colley, Eminence, both of Mo.; Edward Neidhart, Chicago, Ill.; Carl J. Johnson, Highland, Ind.

[73] Assignee: Ogden Engineering Corporation, by said Cooley, Neidhart and Johnson

[22] Filed: Mar. 3, 1972

[21] Appl. No.: 231,670

[52] U.S. Cl. .................219/130, 219/74, 219/136
[51] Int. Cl. ................................................B23k 9/00
[58] Field of Search................219/130, 136, 137, 219/131, 74, 75

[56]  References Cited
UNITED STATES PATENTS

| | | | |
|---|---|---|---|
| 2,866,887 | 12/1958 | Kumagai | 219/130 |
| 3,629,547 | 12/1971 | Kester et al. | 219/130 |
| 3,689,733 | 9/1972 | Matsouie | 219/130 |
| 3,689,732 | 9/1972 | Hill | 219/130 |
| 3,194,943 | 7/1965 | Flora | 219/130 |
| 2,572,084 | 10/1951 | Wilson | 219/130 |
| 3,676,640 | 7/1972 | Bennard | 219/130 |

*Primary Examiner*—J. V. Truhe
*Assistant Examiner*—Gale R. Peterson
*Attorney*—Robert C. Brown, Jr. et al.

[57]  ABSTRACT

The disclosure is directed to a welding gun for MIG welding in which the gas cup and contact tip of the nozzle are secured in place by a single clamp type device that permits ready replacement of both. The nozzle in turn is connected to the gun handle by a single clamp device that permits ready replacement of the nozzle as a unit or ready change of positioning of same relative to the handle. The contact tip carries a spatter deflector defining a tapered spatter deflecting surface which shields the gas passages defined by the gun gas diffuser. Shielding gas and welding current are supplied to the gun through a power cable and associated end connectors especially arranged for this purpose.

15 Claims, 13 Drawing Figures

AIR COOLED WELDING GUN

This application is an improvement of the inventions of application Ser. No. 43,100, filed June 3, 1970, now U.S. Pat. No. 3,659,076, which was a continuation-in-part of application Ser. No. 838,419, filed July 2, 1969 (now U.S. Pat. No. 3,596,049).

This invention relates to a welding gun for semi-automatic welding, and more particularly to a welding gun arrangement that is especially designed for metallic electrode inert gas welding (known in the art as MIG welding).

Conventional guns for MIG welding provide no satisfactory way of preventing heat build up in the gun gas cup, with the result that after prolonged use the spatter which accompanies all MIG welding starts to pit the inside surface of the gas cup which makes it difficult to remove and results in early failure of the gas cup. Tests have shown that as long as the gas cup is maintained sufficiently cool, it will last almost indefinitely so long as mechanical damage to it is avoided.

Furthermore, prior to the inventions of said applications the securement of contact tips and gas cups conventionally was separately accomplished and ordinarily by means of screw threading that is easily damaged.

In accordance with the inventions of said applications, there is provided a welding gun for MIG welding in which the gas cup and the contact tip therefor are simultaneously secured in place by a single clamping arrangement, and the nozzle includes outwardly projecting fins to which heat from the gas cup is transferred through a heat conduction path that includes means for electrically isolating the gas cup from the contact tip. The nozzle is fixedly connected to its handle by a clamp arrangement that permits ready adjustment or replacement of the nozzle in relation to its handle. The handle of the gun is of sectionalized construction for facilitating manufacturing and assembly of same, while the nozzle is in the form of a one piece body adapted for extrusion from aluminum or the like and having its ends threaded to receive fitting elements formed with contractible fingers adapted to be received under the respective clamps that hold the gas cup and contact tip to the discharge end of the nozzle, and the other end of the nozzle to the gun handle.

A principal object of the present invention is to generally improve the gas cup and contact tip arrangement of said applications including providing a novel spatter deflector for the tip means for accurately locating the clamp device for same and the electrically insulating sleeve that is associated with same.

Another principal object of the invention is to provide power cable arrangement for the gun and means for connecting same to the gun which permits shielding gas to be supplied to the gun through the power cable, thereby eliminating the need for a separate gas conduit.

Still other objects of the present invention are to generally improve the manner of connecting the sources of welding wire, shielding gas and electrical power to the gun, and to provide a welding gun that is economical of manufacture, convenient to operate and long lived in use.

In accordance with this invention, the contact tip includes a spatter deflector which is disposed in shielding relation to the gun gas diffuser and is formed with a conical spatter deflecting surface that resists collection of spatter within the gas cup. The gas cup and contact tip clamp device, and the electrically insulating sleeve associated with same are positioned for efficient operation of the clamp device to hold these parts together. The power cable is arranged to have the shield gas transmitted therethrough, thereby eliminating the separate gas conduit which is usually required to supply shielding gas to the gun.

Other objects, uses, and advantages will be obvious or become apparent from a consideration of the following detailed description and the application drawings in which like reference numerals are used to designate like parts throughout the several views.

However, it is to be distinctly understood that the drawing illustrations provided are supplied primarily to comply with the requirements of the Patent Code, and that the invention may have other specific embodiments that will be obvious to those skilled in the art.

GENERAL DESCRIPTION

Figures 1, 2:
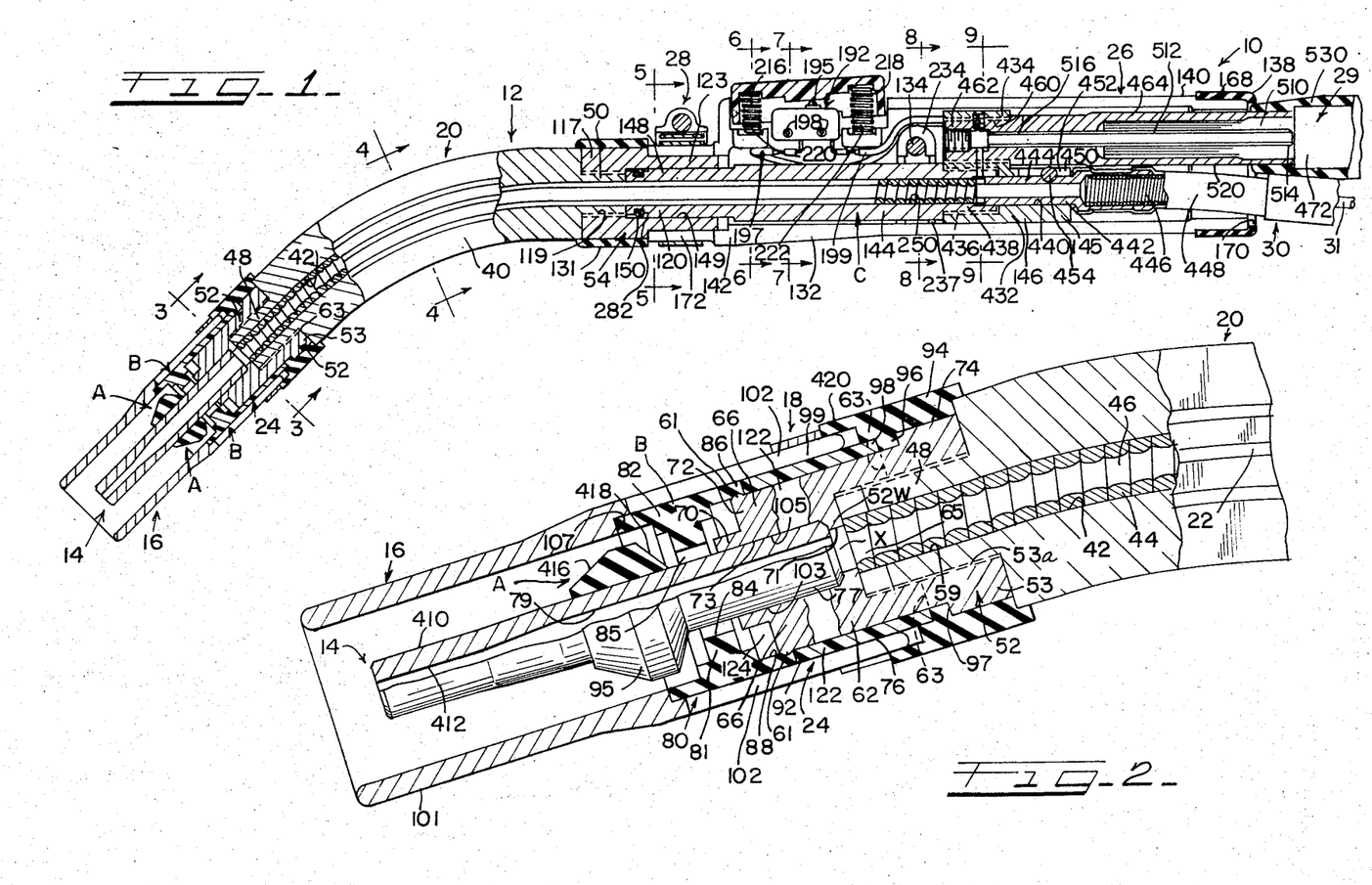
FIG. 1 is a diagrammatic plan view of one embodiment of the invention designed for 500 amp welding, with parts being broken away and shown in section to expose other parts.
FIG. 2 is a showing on an enlarged scale of the working end of the gun nozzle shown in FIG. 1.

Reference numeral 10 of FIG. 1 generally indicates one welding gun embodiment in accordance with this invention, arranged for 500 amp MIG welding, which comprises a nozzle assembly 12 that includes contact tip 14 and jacketing gas cup 16 that are secured to the nozzle assembly 12 by clamp device 18. The nozzle assembly 12 further comprises a nozzle structure 20 that is finned as at 22 for good heat dissipating characteristics, and which is in good heat conducting relation to the contact tip 14; nozzle structure 20 is also in good heat conducting relation to gas cup 16 through an electrically insulating sleeve 24 formed from material of good heat conducting characteristics interposed between the nozzle structure 20 and the contact tip.

The nozzle assembly 12 is secured to handle assembly 26 by clamp device 28. The handle assembly 26 is connected to a power cable 29 arranged to supply both the electrical energy and the usual shielding gas to the gun. The welding wire 31 is supplied to the gun through insulated conduit 30.

In accordance with the invention of said applications, the clamp device 18 serves to clamp both the contact tip 14 and the gas cup 16 to the nozzle assembly and without requiring any screw-threaded connection between these parts and the nozzle assembly. The gas cup fits directly over and engages the electrically insulating sleeve 24, which is annularly contactible, and has good heat transfer characteristics for conducting heat from the gas cup 16 to the nozzle structure 20 for dissipation of the heat from fins 22. Contact tip 14 is held by nozzle structure 20 and is also cooled by heat passing from same to fins 22.

The clamp device 28 permits the operator to readily position the nozzle assembly 12 at any desired position relative to the handle assembly 26, 360° about the axis of the latter, or permits ready removal and replacement of the nozzle assembly 12 as a unit, at the option of the operator.

The improvements and advantages in the specific arrangements illustrated in the drawing figures will become apparent as the description proceeds. For instance, the contact tip includes a novel weld spatter deflector A for shielding diffuser B, and the handles assembly 26 houses a novel adaptor tube assembly C to which the power cable 29 and welding wire conduit are connected to provide the advantages of the invention.

Figure 10:
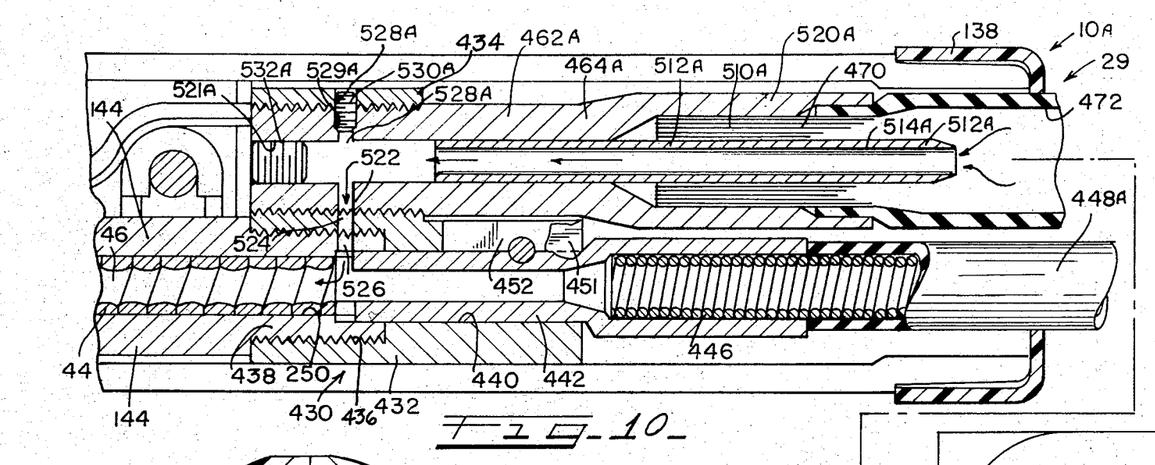
FIG. 10 is an enlarged view of the handle end of the gun, showing a modified embodiment of the invention.

FIG. 10 illustrates another embodiment 10A arranged for 300 amp welding involving the important features of gun 10, but modified for lower amp service.

SPECIFIC DESCRIPTION

Figure 4:
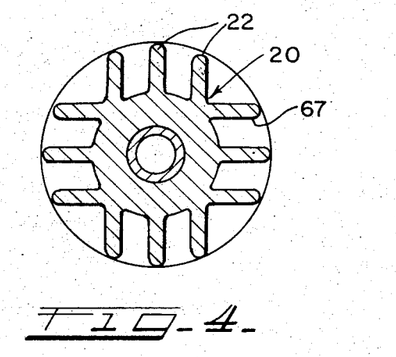

The nozzle structure 20 comprises an elongate gooseneck shaped body 40 that may be conveniently extruded from aluminum or the like and is shaped to have the finned configuration indicated in FIG. 4. Body 40 is angled longitudinally thereof in the manner indicated in FIG. 1 and is shaped to define a longitudinally extending bore 42 which receives a welding wire guide 44 of suitable wear resisting characteristics that in turn defines a bore 46 through which the welding wire and shielding gas pass. Guide 44 is a one piece flat wound helix which extends along bore 42 and back into the handle assembly and through adaptor assembly C, thus providing a continuous guide through the gun to the tip 14.

Figure 3:
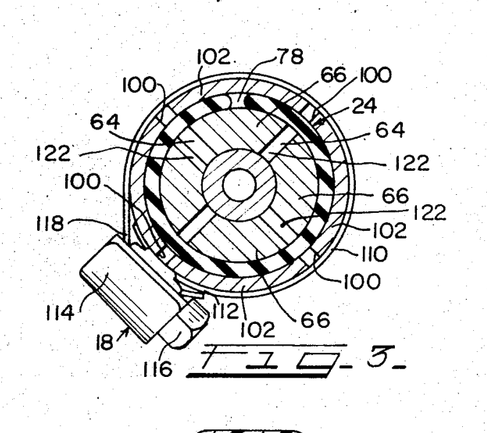
FIGS. 3 – 9 are diagrammatic sectional views taken substantially along the section lines illustrated in FIG. 1.

As indicated in FIG. 3, fins 22 are not radial; rather, the fins 22 along the convex and concave sides of body 40 are in parallelism (and are parallel to the plane of the bend in body 40), but are perpendicular to the fins of the other two sides of body 40 (which lie perpendicular to the plane of bend of body 40). This facilitates bending of the body 40 as the fins 22 bend only in their respective planes or perpendicular thereto, which avoids buckling and permits ready removal of bending machine elements engaging body 40.

The body 40 is formed to define threaded end portions 48 and 50 that receive the respective fitting elements 52 and 54 that are formed to provide for securement of the body 40 within the clamp devices 18 and 28. The exterior surface of body 40, including all surfaces of fins 22, and after it is bent to the curved configuration of FIG. 1, are coated with a thin coating of a suitable electrically insulating substance that is resistant to mechanical displacement and does not impede heat transfer from the nozzle.

In one embodiment of the invention, the exterior of body 40 is hard anodic coated to a depth of about 0.002 inch to provide the desired electrical insulating. Hard anodic coating of aluminum provides a coating or covering 67 formed of aluminum oxide that is electrically insulating. Any one of the conventional hard anodic coating procedures known may be employed for this purpose, several being identified in the article by R. V. Vanden Berg entitled "Characteristics of Hard Anodic Coatings on Aluminum" that appeared in the Mar. 15, 1962 issue of Design Magazine (pages 3 – 7). Alternately, a suitable epoxy resin may be employed.

The fitting element 52 includes a cap portion 53 internally threaded as at 53A to receive externally threaded end portion 48 of body 40, which defines a bore 56 that is proportioned to closely receive the welding wire guide 44, which extends therethrough up to close adjacency with the contact tip 14. Fitting element 52 also comprises a sleeve portion 62 of decreased external diameter, with the fitting element 52 being formed with gas conveying slots 64 (see FIG. 3) that are equally spaced apart about its circumference and extend longitudinally thereof to define spaced fingers 66. As indicated in FIG. 2, the slots 64 extend to its cap portion 53 as indicated at 63. The fingers 66 each include an extension 70 of reduced thickness at the outwardly extending end 72 of the element 52, the inwardly extending end 74 comprising the cap 53 which is threaded on the body 40. Fitting element 52 defines an annular wall 52W forming a short bore 71 aligned with the end 65 of guide 44 and a bore 73 through sleeve portion 62 that is proportioned to closely receive contact tip 14, the fitting element 52 thus forming the contact tip collet or gripping portion of the gun.

The electrically insulating sleeve element or member 24 is received over the fingers 66 of the fitting element 52; as disclosed in application Ser. No. 43,100, it is formed from a material of good heat conducting characteristics, and is covered or coated with a coating or layer of an electrically insulating substance 76. Sleeve 24 is made annularly contractible, that is, contractible radially of the fitting element 52, in a suitable manner, as by giving same an internal diameter that is on the order of the external diameter of the sleeve portion 62 of fitting element 52, and splitting same longitudinally thereof as at 78 (see FIG. 3).

In accordance with one embodiment of the invention the sleeve element 24 is formed from aluminum and is hard anodic coated to a depth of about 0.002 inch to provide the desired electrical insulation. Preferably all surfaces of sleeve member 24 have this coating, which may be of the same type as referred to above in connection with coating 67 of nozzle body 40.

Figure 13:
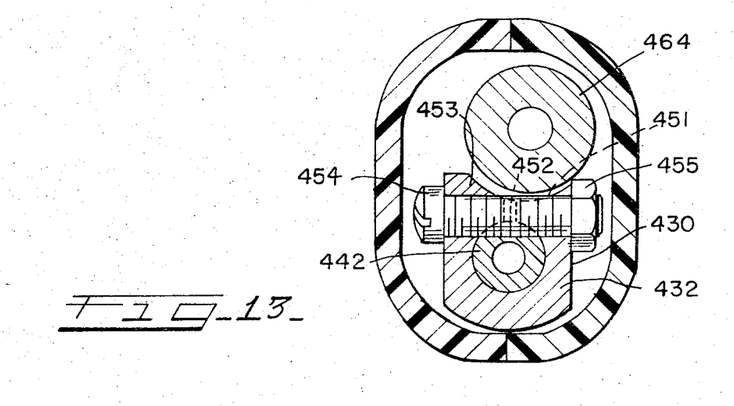
FIG. 13 is a cross-sectional view along line 13–13 of FIG. 12.

Alternately, an aluminum sleeve having the configuration indicated in FIG. 13 may be coated by a suitable electrically insulating adhesive, such as Scotch Weld 2214 Hi-Temp adhesive made by 3M Company.

The contact tip 14 itself is of special configuration; its inner end 77 is unthreaded and is proportioned to closely fit within bore 73 of fitting element 52. It defines the usual bore 79 to closely receive the welding wire 31 for making the conventional welding current contact therewith. Contact tip end 77 seats against one side of wall 52W and the end 65 of guide 44 seats against the other side of same. The shielding gas supplied to bore 42 (as hereinafter described) flows in, around, and through the coils of guide 44 to discharge into a gas pooling area X that is defined by body end portion 48 and fitting element 52, and that is open to slots 64.

In the illustrated embodiment, end 410 of the tip 14 is formed to define a bore portion 412 that complements the size welding wire to be handled by gun 10. This is done by swaging tip end 410 against a piano wire having a size on the order of 10 – 15 percent the size of the welding wire that is to pass through tip 14, and insures a smooth guiding surface in tip end 410 as well as good electrical contact at this point.

In the embodiments illustrated, contact tip 14 has received over same diffuser B in the form of element 80, which in accordance with the present invention, comprises a double ended sleeve portion 82 having a radial wall 81 defining a bore 84 having an internal diameter that exceeds the external diameter of the tip to define annular gas flow orifice 85 that is uninterrupted about its periphery. Diffuser element 80 end 86 has bore 88 that substantially complements the external diameter of the fitting element sleeve portion 62 for close fitting relation therewith.

In accordance with the present invention, the contact tip 14 has fixed thereto a weld spatter guard or shield or deflector A in the form of annular disc or body 95 fixed to tip 14 and proportioned to overlie orifice 85 of diffuser B to shield same from weld spatter. Body 95 is shaped to define a forwardly facing frustoconical deflector surface 416 that has an angulation lying in the range of from about 45° to about 60° with respect to the longitudinal axis of tip 14. Body 95 is formed from silicone rubber. It has been found that angulation of surface 416 on the order indicated results in spatter either not striking the body 95 at all or it strikes body 95 (at surface 416) at such a sharp angle it bounces off. Furthermore, the material from which body 95 is formed resists adherence of weld spatter to same (the surfaces of body 95 tend to harden as body is heated).

The result is that spatter build up on body 95 is avoided and such little spatter build up that does occur elsewhere can be readily removed by rapping the gun nozzle on a hard surface.

Body 95 also defines a rearwardly facing frustoconical surface 418 which serves to spread out the gas flow from orifice 85. Also, in the event the gas cup is removed without first removing the contact tip 14, surface 418 facilitates drawing the diffuser over the deflector A (the materials from which the diffuser and deflector are made permitting the expansion and contraction of these parts that are necessary to permit this).

Received over the cap portion 53 of fitting element 52 is an electrically insulating sleeve member 94 formed of silicone rubber or the like and defining a radial flange portion 96 received between the end 98 of the insulating sleeve member 24 and the shoulder 97 of the fitting element 52. Sleeve member 94 serves as a bumper guard for the gun and insulator for cap portion 53 of element 52. It also includes an end flange 420 proportioned to act as a seating abutment for clamp device 18 to position same for best clamping action on the gas cup and nozzle fingers 66.

The sleeve element 24 is snap fitted in place on the fingers 66 of fitting element 52, in accordance with the present invention, between flange portion 96 of sleeve 94 and protuberances 61 defined by fingers 66 at the end 72 of filling element 52. Protuberances 61 permit sleeve element 24 to be snapped over same into engagement with flange portion 96, and retain the sleeve element 24 in place when the gas cup is removed.

The gas cup 16 is formed from any suitable material, such as aluminum, copper or brass, and its forward end 101 that extends beyond the contact tip in the direction of the work has the conventional annular configuration. The other end 99 thereof is formed with a plurality of slots 100 (see FIG. 3) to define spaced fingers 102 that are received over the electrically insulating sleeve 24 and extend under end flange 420 of the electrically insulating sleeve 94 at the end 99 of the gas cup.

As indicated in FIG. 10, the fingers 102 of the gas cup have an internal configuration such that they substantially complement and closely fit over the insulating sleeve 24, while the fingers 66 of the fitting element 52, which incidentally form the fingers of the nozzle structure 20, are proportioned to substantially complement and closely fit over the contact tip external surface 103, when the clamp device 18 is in its released position. The fitting element 52 is preferably made from copper, or internal surfaces 105 of fingers 66 are preferably copper or silver plates, to avoid layers of oxide from building up at this point, and such surfaces are free from screw threading, in accordance with this invention.

Gas cup 16 is formed with an internal shoulder 107 adapted to seat against the diffuser element 80 in the assembled relation of the nozzle structure. Element 80 having an external diameter that is substantially the same as sleeve 24 in its unstressed condition, and as element 80 is resiliently flexible in nature, it accommodates the contacting of gas cup fingers 102 against sleeve 24.

The clamp device 18 in practice may be of any suitable type, but in the form shown is of the familiar hose clamp type comprising a metal strip 110 (see FIG. 3) shaped to annular form with one of its ends 112 anchored in housing 114 that journals a screw element 116 formed with suitable threads in meshing relation with spaced slots (not shown) formed in strip 110 (as is illustrated in said application Ser. No. 43,100). End 118 of strip 110 extends over end 112 and through housing 114 for engagement with screw element 106, which when rotated relative to housing 114, feeds strip end 118 one way or the other to expand or contract the hose clamp.

When the fitting element 52 has been applied to the end 48 of nozzle structure 20, and the contact tip 14, insulating sleeves 24 and 94, diffuser element 80, and the gas cup 16 have been applied in the manner indicated in FIG. 2, as by slipping them into place to the respective positions indicated, application of the clamp device 18 about the end 99 of the gas cup and tightening of same thereabout (as by turning screw element 116 in the appropriate direction) contracts and compresses the end 99 of the gas cup against the insulating sleeve 24, which in turn contracts inwardly against the fingers 66 of fitting element 52, which are in turn deflected inwardly against the contact tip 14 to hold it firmly in place. Removal and changing of the contact tip and gas cup is readily effected by loosening the clamp device 18 so that the contact tip and gas cup may be appropriately gripped to be withdrawn, as necessary, from the gun to be replaced by suitable replacements of similar configuration, after which the clamp device 18 may be again tightened to secure the replacement in place.

As will be observed from FIGS. 1 and 2, the bore 79 of the contact tip is aligned with the bore 46 of guide 44, for passage therebetween of the welding wire 31. The shielding gas also passes through the bore 46 of the guide tube, proceeding through spaces between the coils of guide 44 into pooling area X and then into the spaced gas passages 122 that are defined by the slots 64 of the fitting element 52 and the parts overlying and underlying same, which lead to a pooling chamber 124 (see FIG. 3) defined by the diffuser element 80 and the end 72 of the fitting element 52, from which the gas passes through the orifice 85 of the diffuser element and outwardly of the gas cup about deflector A in an annular flow which proceeds outwardly of the gas cup for shielding of the arc. The inner diameter of guide 46 is significantly larger than the outer diameter of the welding wire to define the gas passage space with guide 46.

Figure 5:
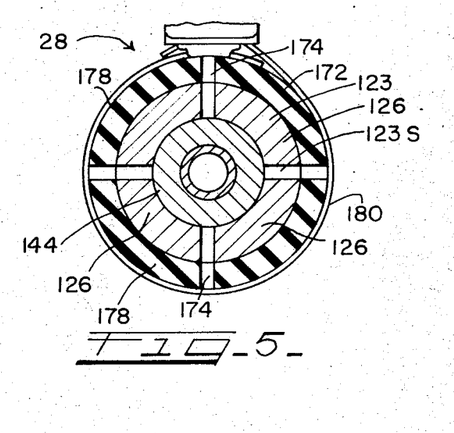

The fitting element 54 at the other end portion 50 of the nozzle body 40 (see FIG. 1) defines a cap portion 117 that is internally threaded as at 119 to receive the nozzle body threaded end portion 50, a bore 149 (see FIG. 1) that receives the end 120 of adapter tube assembly C, and a sleeve portion 123 which is slotted as at 123S (see FIG. 5) to define fingers 126 that are received within the handle assembly 26 underneath the clamp device 28. The outer surfaces of element 54 are suitably insulated, as by being covered by insulating sleeve 131 formed from silicone rubber or the like, or by being hard anodic coated in the same manner as sleeve 24. Coating of the contacting surfaces of the adaptor tube, and fingers 126 with silicone grease insures electrical contact and prevents oxide build up.

Figure 8:
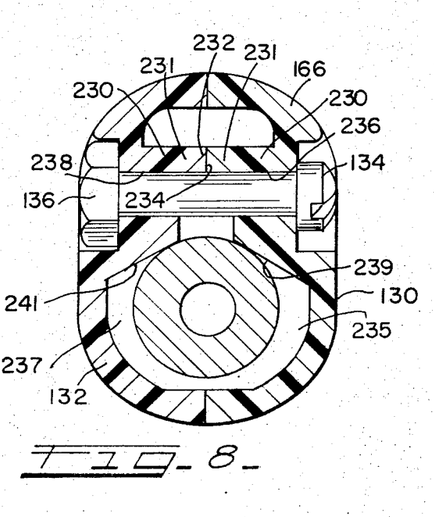
Figure 9:
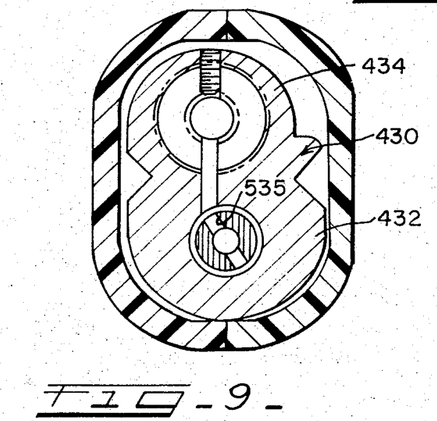

The handle assembly 26 generally comprises a pair of housing sections 130 and 132 secured together by a bolt 134 (see FIG. 8) cooperating with nut 136, hollow end cap 138 at the handle assembly end 140, and the clamp device 28 at the housing end 142. Sections 130 and 132 may be formed from a suitable plastic of adequate electrically insulating and thermal stability qualities, such as the high impact fiberglas reinforced phenolic resin molding compound made and sold by Fiberite Corporation and identified as FS-5064, as described in said application Ser. No. 43,100.

Received between the handle assembly sections 130 and 132 is adapter tube assembly C which includes adapter tube 144 and fitting assembly 145 formed from aluminum or copper or the like, the latter forming the end 146 of the adapter tube 144. The bore 250 of adapter tube 144 is shaped to receive welding wire guide 44 that extends therethrough into and through nozzle body 20 when the nozzle and handle assemblies are in assembled relation. The adapter tube 144 is recessed as at 282 to receive suitable seal 150 that is disposed in gas sealing relation with fitting element 54.

Fingers 126 of the nozzle structure fitting element 54 grip the adapter tube end 148 when clamp 28 is operative, and their internal surfaces 149 are preferably copper or silver coated for the same reasons as fingers 66.

The handle sections 130 and 132 define a housing 166, which at its end 140 is recessed about its outer periphery, as at 168, to frictionally receive the end cap 138 on same. End cap 138 defines opening 170 through which the cable 29 and conduit 30 pass into the handle assembly. The end cap 138 and housing 166 may be formed to provide the snap action locking relationship that is described in said application Ser. No. 43,100.

The housing 166 at the end 142 of the handle assembly 26 is formed to define a sleeve portion 172 that is slotted as at 174 (see FIG. 5) to define fingers 178 between which the fingers 126 of the nozzle assembly fitting element 54 are received to provide the desired fixed but adjustable relation of assemblies 12 and 26.

The clamp device 28 may be of any suitable type and for purposes of illustration it is assumed to be similar to the clamp device 18 and thus is of the familiar hose clamp type including metal strip 180 shaped to annular form with one of its ends 181 anchored in housing 182 that journals screw element 183 in threaded engagement with the conventional spaced slots of strip 180. The other end 184 extends over end 181 and through housing 182 for engagement with screw element 182. As in device 18, rotation of screw element 183 one way or the other expands or contracts clamp device 28.

It will thus be seen that when the clamping device 28 is actuated to secure the nozzle assembly 20 to the handle assembly 26, the finers 178 of the housing 166 are contracted against the fingers 126 of the nozzle assembly, which are in turn contracted against the adapter tube 144, whereby the nozzle assembly 12 and handle assembly 26 are releasably secured to each other.

It will also be seen that the nozzle assembly can be readily adjusted relative to the handle assembly through an arc of 360° at the option of the operator merely by loosening the clamp device 28 and manually positioning the nozzle assembly 20 as desired relative to the handle assembly 26, after which the clamp device is re-tightened. Similarly, the entire nozzle assembly 12, if and when found defective, can readily be replaced by loosening the clamp device 28, removing the defective nozzle assembly, applying the replacement nozzle assembly to the position indicated in FIG. 1, and re-tightening the clamp device 28.

Figure 7:
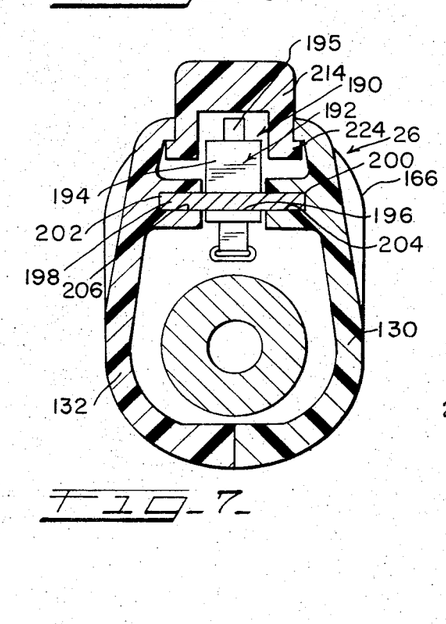

The housing 166 defined by the handle assembly sections 130 and 132 is shaped to define a switch chamber 190 (see FIG. 7) in which is received a suitable off-on switch 192 that comprises the usual housing 194, push button 195 and suitable operating parts (not shown).

The switch housing 194 is formed with a pair of laterally extending openings 196 that each receive a mounting pin 198, which pins 198 have their respective end portions 200 and 202 respectively received in mounting recesses 204 and 206 of the housing 166. The switch 192 contains the usual electrical contacts that are adapted to be closed by deflection of push button 195, with the switch being connected by suitable leads 197 and 199 to the welding machine for purposes of actuating same in the usual manner. In the form shown, leads 197 and 199 extend to suitable connectors of the type shown in said application Ser. No. 43,100 for connection to leads (not shown) which extend to the welding machine, for incorporation in a conventional welding circuit. Leads 197 and 199 proceed through the indicated recesses in the housing 166 to present their connectors adjacent end cap 136. In addition to the form shown, leads 197 and 199 may be adapted conventionally for quick connection to the corresponding terminals of switch 192.

Figure 6:
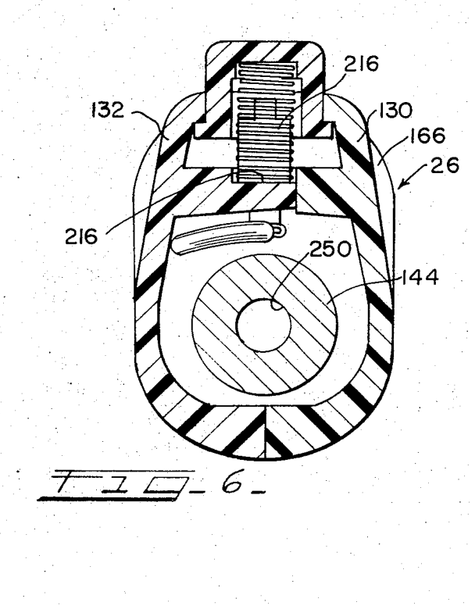

In the specific arrangement illustrated, the switch chamber 190 is closed by thumb actuated trigger 214 that is biased outwardly of the switch chamber 190 by appropriate compression springs 216 and 218 that cooperate between same and the respective spring seats 220 and 222 there defined by the housing 166. Trigger 214 is flanged as at 224 (see FIG. 6) for suitable engagement with housing 166 such that the trigger 214 will be spaced from button 195 in the release position of same (and in the "off" position of the gun).

The sections 130 and 132 of the handle assembly that form housing 166 are formed as at 230 (see FIG. 8) to define solid portions 231 that form abutting surfaces 232 and 234 at the respective openings 236 and 238 through which the securing bolt 134 is received. The sections 130 and 132 are also each formed with spaced flanges 235 and 237 that engage the adapter tube from below, and tapered centering surfaces 239 and 241 that engage the adapter tube 144 from above, when the handle sections 130 and 132 are assembled together. As indicated in the sectional views of FIGS. 3 – 8, the sections 130 and 132 abut each other about the top and bottom of the handle assembly, except in the area of the trigger 214, the handle assembly end opening 170 over which end cap 138 is received, and the handle assembly fingers 178.

Figure 12:
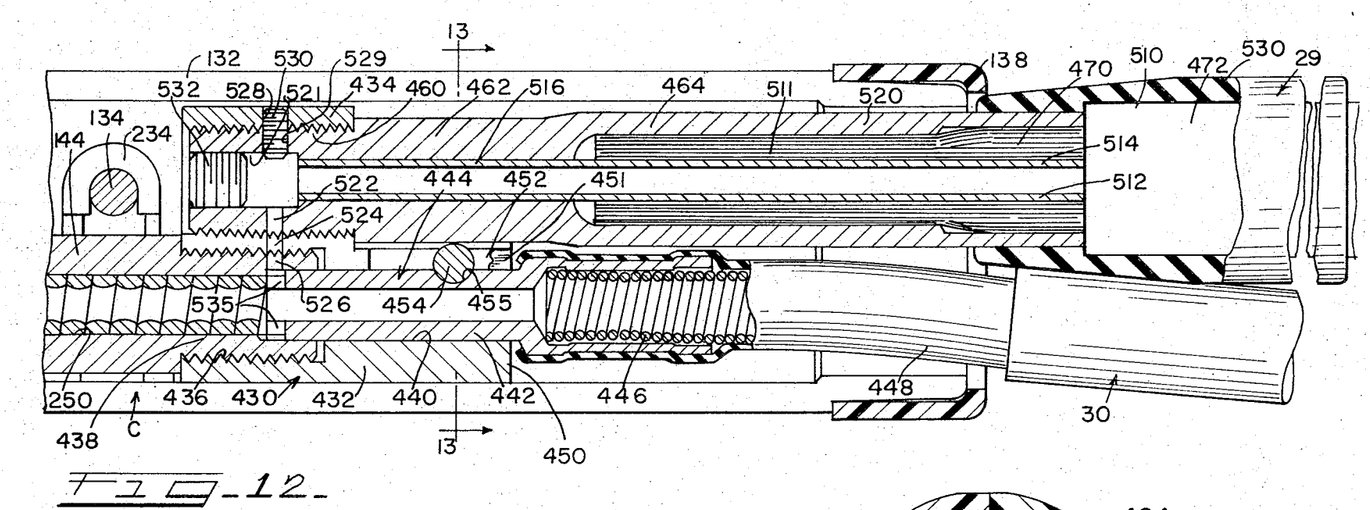
FIG. 12 is a view similar to that of FIG. 10, but illustrating the embodiment of FIG. 1.

The fitting assembly 145 of adapter tube assembly C generally comprises the body 430 (see FIGS. 1, 12 and 13) having a lower tubular portion 432 and an upper tubular portion 434. The fitting assembly portion 432 is integrally threaded as at 436 to threadedly receive the externally threaded extension 438 of adapter tube 144. The fitting assembly portion 432 also defines a bore 440 that is axially aligned with the bore 250 of the adapter tube 144 and receives the shank 442 of tubular connector 444 which is suitably affixed to the end of welding wire conduit 30. Welding wire conduit 30 is of conventional form comprising the usual helical wire core 446 enclosed in suitable insulating sheathing 448.

In the form shown, the end portion 450 of the tubular portion 432 is slotted as at 452 so that the resulting slotted end portions 451 and 453 can be pulled together against the connector shank 442 by suitable screw 454 applied to nut 455, whereby connector 444 is affixed in place to the fitting assembly 145. Connector shank 442 is recessed as at 455 to accommodate screw 454.

The fitting assembly portion 434 is formed with a suitable internally threaded socket 460 to threadedly receive end portion 462 of the power cable connector 464 to which power cable 29 is affixed.

In this connection, it is pointed out that the adapter tube fitting assemblies and connector shown in FIGS. 1 and 10 are substantially identical, with some changes in size due to the different sized welding gun involved in each Figures. However, a description of one applies to both except where indicated, identical reference numerals being employed in each case except in the form of FIG. 10 the suffix A is used.

Figure 11:
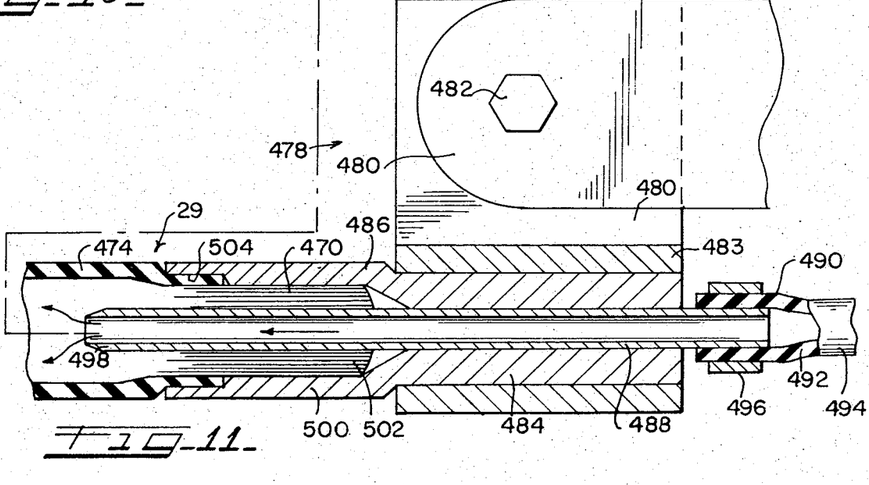
FIG. 11 is a diagrammatic view illustrating how the guns of FIGS. 1 and 10 are connected to sources of welding current and shielding gas from supplying same to the gun through a common conduit.

As previously indicated, it is an important objective of this invention to supply the shielding gas to the guns 10 and 10A through the power cable, and for this purpose, the power cable 29, which conventionally consists of the usual copper stranding 470 encased in insulating jacket 472, has its end 474 (see FIG. 11) connected to a suitable main power cable 476 by a connecting device 478 comprising a suitable bracket 480 fixed to cable 476 by suitable bolt 482 and having affixed thereto mounting sleeve 483 in which the shank 484 of the power cable end connector 486 is suitably affixed.

In accordance with this invention, the connector 486 is equipped with a gas tube 488 having its end 490 secured to the end 492 of gas supply hose 494 by suitable hose clamp 496 that may be of the same general type of clamping device as clamping devices 18 and 28. Hose 494 leads to a suitable source of shielding gas under pressure such as a conventional gas pressure tank.

The other end 498 of gas tube 488 is embedded in the stranding 470 of cable 29.

In the particular form illustrated, connector 486 has an enlarged end portion 500 which receives the bared end 502 of the cable 29 and is swaged thereagainst to affix connector 486 to the cable 29. Connector end portion 500 is counterbored at 504 to also receive a portion of the cable insulating jacket 472.

The other end 510 of the power cable is similarly applied to the respective cable connectors 464 and 464A. The cable connectors 464 and 464A each include the respective gas tubes 512 and 512A, respectively, that serve a purpose similar to that of tube 488.

Thus, the end 514 of gas tube 512 is embedded in the stranding 470 of the cable 29 while the other end 516 of same is suitably affixed within the connector 464.

As in the case of cable connector 486, the cable connector 464 includes enlarged portion 520 in which the bared end 510 of the power cable 29 is received, connector portion 520 being swaged against the cable end 510.

The gas tube 512 at its end 516 communicates with bore 521 of connector 464 and suitable passageways 522, 524 and 526 formed in the connector 464, fitting assembly 430, and adapter tube 144 whereby shielding gas entering gas tube 512 has access to the bore 46 defined by the welding wire guide 44. In the form shown, the passages 522, 524 and 526 are formed after the parts involved are assembled by drilling along the drill line that is indicated by the passages 522, 524 and 526, with the needed openings 528 and 529 of connector of body 430 and 464 being closed by suitable screw 530 having its threading appropriately sealed. Similar screw 532 closes the other unneeded bore opening 521 of the connector 464, it being understood that all the threaded connections of the fitting assembly 145 are suitably sealed against gas leakage. The end 534 of connector 444 is slotted as at 535 to complete connection of passageways 522, 524 and 526 to the bore 250 of adapter tube 144.

The manner of connecting cable 29 to the body 430 in the embodiment of FIG. 10 is the same as indicated by corresponding reference numerals bearing the suffix A.

When shielding gas of a suitable type is supplied under pressure to gas tube 494, and assuming the guns 10 and 10A are assembled and connected to the power cable in the manner indicated in the drawings, gas flows through gas tube 488 into the power cable 29 and through the latter to gas tube 512, from which the gas passes to and through passages 522, 524, and 526, and slot 535 of connector 442, into bore 46 for conveyance to the gas cup.

Assuming that the main power cable 476 is connected to a suitable welding machine, the electrical circuit involved between the cable 476 and the contact tip 14 is through the bracket 480 and its sleeve 483, connector 486, stranding 470 of cable 29 to connector 464 and thence to fitting assembly 145, adapter tube 144, nozzle end fitting 54, nozzle body 20, nozzle end fitting 52, and thence to the contact tip 14, where the welding wire picks up the current in the usual manner at contact tip bore portion 412. In this connection, the fins 22 of the nozzle body 40 also provide a part of the electrical conducting path of the gooseneck, which reduces the amount of metal mass required to form the body 40. The electrical circuit for gun 10A is similar, as indicated by FIG. 10.

The welding wire 31 is supplied to the guns 10 and 10A by feeding same through welding wire conduit 30 using a suitable power feed machine of a conventional type in the type relationship required for good welding results, depending on the welding conditions involved.

In the form of FIG. 1, the power cable connector 464 extends externally of the housing and therefore the abutting portions of its enlarged portion 420 and the cable sheathing 472 are suitably covered by an insulating coating 530.

It will therefore be seen that I have provided in an MIG welding gun arrangement, a nozzle structure which not only insures adequate cooling of the gas cup and contact tip as well as the necessary electrical insulating of the gas cup from the welding current, but also provides a single clamping arrangement for securing both the welding cup and the contact tip to the nozzle without requiring screw threading of either element.

The heat transfer path from the gas cup is through the relatively wide and long transfer area defined by the electrically insulating heat transfer sleeve 24 from which the heat passes through nozzle fittings 52 and 54 to nozzle end 48 and fins 22.

Furthermore, a clamping device joins the nozzle structure to the handle structure that is similar to that securing in place the gas cup and contact tip and provides a fixed but adjustable connection that permits ready adjustment and/or replacement of the nozzle at the option of the operator. The same arrangement permits the operator to dispose the trigger switch in any position he desires relative to the nozzle, the pivotal disposition of the trigger permitting ready operation of the trigger switch when the handle assembly is held upside down.

The handle forming assembly is made in two parts that are readily separated for any maintenance that may be necessary. The two section construction of the housing adapts this structure for economical injection molding production procedures or the like. The clamp type connection between the handle and nozzle assemblies serves as the primary strength point of the gun, which need be only long enough to provide a good electrical contact since the handle assembly is also braced in the area of the connecting bolt. The overall result is that the handle is adequately strong while being sufficiently small diameter-wise to be comfortably gripped by the user and still provide long leverage to work with in handling the gun.

The single piece construction of the nozzle body 40 and the arrangement of its fins 22 adapts this component of the invention for economical extrusion forming methods, after which the ends of the body may be readily turned down to define end portions 48 and 50 and suitably threaded for application thereto of the end fittings 52 and 54. The body 40 may then have the guide tube applied thereto and be bent to the angle indicated in any suitable manner.

In combination, the over-all assemblage is of very light and easily maneuverable construction, yet is well suited for long lived multipurpose operation.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a welding gun for gas shielded consumable electrode welding including a nozzle structure defining means for supplying welding wire and shielding gas to the arc including an elongate electrically conductive body formed to define a guide passage extending longitudinally thereof for guiding the welding wire through the nozzle structure, with said passage having a welding wire intake end and a welding wire discharge end, a contact tip having a welding wire intake end and a welding wire discharge end removably secured adjacent its intake end in electrical conducting relation to said body at said discharge end of said guide passage and formed with a bore along its central axis between said ends thereof through which the welding wire passes to the arc, and a gas cup received about the contact tip and carried by the nozzle structure for directing shielding gas supplied through the nozzle structure to and between the cup and the contact tip to the arc, the improvement including:

a gas diffuser member received over said contact tip radially between said tip and said gas cup and defining orifice means about said tip for passing shielding gas therethrough, and a weld spatter shield carried by said tip in protecting relation to said diffuser member orifice means, said spatter shield comprising:

an annular member having the end thereof facing downstream of the shielding gas flow through the cup formed to define a frustoconical spatter deflecting surface at an angle in the range of from about 45° to about 60° with respect to said axis of said tip, said annular member at the upstream end of said surface thereof having a dimension radially of said tip that exceeds the corresponding dimension of said orifice means.

2. The improvement set forth in claim 1 wherein:

said bore of said contact tip at said discharge end thereof is swedge formed to the external size of the welding wire.

3. The improvement set forth in claim 1 wherein: said spatter shield is formed from silicone rubber.

4. A contact tip for gas shielded consumable electrode welding guns, said tip comprising:
an elongate rectilinear tubular member having a welding wire receiving end and a welding wire discharge end,
and a weld spatter deflector, carried by said tubular member intermediate said ends thereof,
said weld spatter deflector comprising an annular member affixed to said tubular member in substantial concentric relation thereto and having the end thereof facing said tubular member discharge end formed to define a frustoconical spatter deflecting surface that converges in the direction of said tubular member discharge end.

5. The contact tip set forth in claim 4 wherein:
said deflector deflecting surface has a taper in the range of from about 45 to about 60° with respect to said tubular member,
said deflector being formed from silicone rubber.

6. In a welding gun for gas shielded consumable electrode welding including a nozzle structure defining means for supplying welding wire and shielding gas to the arc including an elongate electrically conductive body formed to define a guide passage extending longitudinally thereof for guiding the welding wire through the nozzle structure, with said passage having a welding wire intake end and a welding wire discharge end, a contact tip removably secured in electrical conducting relation to said body at said discharge end of said guide passage through which the welding wire passes to the arc, and a gas cup received about the contact tip and carried by the nozzle structure for directing shielding gas supplied through the nozzle structure to and between the cup and the contact tip to the arc, the improvement wherein:
said body at said discharge end of said passage has an end portion that is annularly contractible about said passage discharge end,
said contact tip being received in said body end portion,
said gas cup having one end portion received over said body one end portion,
said gas cup one end portion being annularly contractible,
means for releasably clamping said gas cup one end portion against said body one end portion to secure both said contact tip and gas cup to said body,
said clamping means comprising a strip encircling said cup one end and means for releasably tightening said strap against said cup one end,
an electrically insulating member received about said nozzle structure adjacent said end portion of same and defining a lip under which the terminal portion of said cup one end is inserted,
said lip being proportioned longitudinally of said nozzle structure to center said strap over said cup and body end portions when disposed in abutting relation therewith.

7. The improvement set forth in claim 6 wherein:

annularly contractible heat transfer means is interposed between said gas cup and said body end portion in concentric relation therewith,
said heat transfer means comprising an annularly contractible sleeve formed from a heat conductive material having an electrically insulating covering,
and means for restraining said sleeve against movement longitudinally thereof relative to said body.

8. The improvement set forth in claim 6 wherein:
said body guide passage has received in same a flat wound helix extending longitudinally thereof through which the welding wire passes.

9. A welding gun for consumable electrode welding, said gun comprising:
a nozzle structure,
a handle structure for said nozzle structure and comprising an adapter tube having a bore extending longitudinally thereof and having one end of same connected to said nozzle structure,
means for connecting the other end of said adapter tube to a source of welding wire,
and means for connecting said adapter tube to sources of electrical energy and shielding gas,
the last mentioned means comprising:
a welding current power cable having one end of same electrically connected to said adapter tube and the other end of same electrically connected to a source of welding current,
means for supplying shielding gas to said power cable adjacent said other end thereof,
and means for connecting said power cable one end to said adapter tube bore for conveying shielding gas passing through said power cable to said tube bore.

10. The gun set forth in claim 9 wherein:
said means for connecting said power cable one end to said adapter tube bore comprises:
a connector element made fast to said power cable one end,
said adapter tube including a fitting component on one side thereof,
means for making said power cable connector element fast to said adapter tube fitting component,
a tubular element having one end of same inserted into the stranding of said cable at said cable one end and extending into said connector element,
said connector element, said fitting component and said adapter tube being formed to convey gas passing into said tubular element to said adapter tube bore.

11. The gun set forth in claim 9 wherein:
said means for supplying shielding gas to said power cable other end comprises:
a connector element made fast to said power cable other end and in electrical conducting relation to the stranding thereof,
a tubular element extending through said connector element and having one end of same inserted into the stranding of said cable and the other end of same connected to a source of shielding gas,
said connector element being connected to the source of welding current.

12. In a welding gun for gas shielded consumable electrode welding including a nozzle structure defining means for supplying welding wire and shielding gas to the arc including an elongate electrically conductive body formed to define a guide passage extending longitudinally thereof for guiding the welding wire through the nozzle structure, with said passage having a welding wire intake end and a welding wire discharge end, a contact tip removably secured in electrical conducting relation to said body at said discharge end of said guide passage through which the welding wire passes to the arc, and a gas cup received about the contact tip and carried by the nozzle structure for directing shielding gas supplied through the nozzle structure to and between the cup and the contact tip to the arc, the improvement comprising:

an adapter tube having a bore extending longitudinally thereof and having one end of same connected to said nozzle structure at the welding wire intake end of said nozzle structure passages, means for connecting the other end of said adapter tube to a source of welding wire, and means for connecting said adapter tube to sources of electrical energy and shielding gas, the last mentioned means comprising:

a welding current power cable having one end of same electrically connected to said adapter tube and the other end of same electrically connected to a source of welding current, said power cable comprising a stranded wire core encased in an insulating jacket, means for supplying shielding gas to said power cable adjacent said other end thereof, and means for connecting said power cable one end to said adapter tube bore for conveying shielding gas passing through said power cable to said tube bore.

13. The gun set forth in claim 12 wherein:
said means for connecting said power cable one end to said adapter tube bore comprises:

a connector element made fast to said power cable one end, said adapter tube including a fitting component on one side thereof, means for making said power cable connector element fast to said adapter tube fitting component, a tubular element having one end of same inserted into the stranding of said cable at said cable one end and extending into said connector element, said connector element, said fitting component and said adapter tube being formed to convey gas passing into said tubular element to said adapter tube bore.

14. The gun set forth in claim 12 wherein:
said means for supplying shielding gas to said power cable other end comprises:

a connector element made fast to said power cable other end and in electrical conducting relation to the stranding thereof, a tubular element extending through said connector element and having one end of same inserted into the stranding of said cable and the other end of same connected to a source of shielding gas, said connector element being connected to the source of welding current.

15. The improvement set forth in claim 12 wherein:
said means for connecting said adapter tube other end to the source of welding wire comprises:

a helical wire conduit having an insulating jacket, with one end of said wire conduit being connected to the welding wire source, a tubular connector element made fast to the other end of said conduit and received in said adapter tube other end, and means for clamping said adapter tube other end against said connector element to make same fast to said adapter tube.

* * * * *